(12) United States Patent
Doi et al.

(10) Patent No.: US 7,020,152 B1
(45) Date of Patent: Mar. 28, 2006

(54) NETWORK SYSTEM FOR CONTROLLING INDEPENDENT ACCESS TO STORED DATA AMONG LOCAL AREA NETWORKS

(75) Inventors: Toshio Doi, Chiba (JP); Masashi Muramatsu, Chiba (JP); Hiroshi Matsumura, Chiba (JP); Toshiaki Fujii, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 0 days.

(21) Appl. No.: 09/830,382

(22) PCT Filed: Nov. 2, 1999

(86) PCT No.: PCT/JP99/06122

§ 371 (c)(1),
(2), (4) Date: Jul. 12, 2001

(87) PCT Pub. No.: WO00/28700

PCT Pub. Date: May 18, 2000

(30) Foreign Application Priority Data

Nov. 5, 1998 (JP) .................................. 10/314494

(51) Int. Cl.
*H04L 12/28* (2006.01)

(52) U.S. Cl. .......................... 370/419; 709/213; 710/36
(58) Field of Classification Search ................ 370/392, 370/252, 278, 403, 401, 338, 386, 381, 445, 370/423, 412–418, 230, 235, 389, 359, 419, 370/428, 463; 700/169; 709/232, 216, 213, 709/217, 319, 219, 223; 711/221, 153, 112; 713/155, 201, 202; 364/200; 380/25; 705/50; 717/101; 714/4; 710/36
See application file for complete search history.

(56) References Cited

U.S. PATENT DOCUMENTS

| | | | | |
|---|---|---|---|---|
| 4,692,862 A | * | 9/1987 | Cousin et al. | 710/316 |
| 5,633,865 A | * | 5/1997 | Short | 370/412 |
| 5,771,349 A | * | 6/1998 | Picazo et al. | 713/202 |
| 5,781,715 A | * | 7/1998 | Sheu | 714/4 |
| 6,175,571 B1 | * | 1/2001 | Haddock et al. | 370/423 |
| 6,697,846 B1 | * | 2/2004 | Soltis | 709/217 |

* cited by examiner

*Primary Examiner*—John Pezzlo
(74) *Attorney, Agent, or Firm*—Adams & Wilks

(57) ABSTRACT

A network system has a first LAN, a second LAN, and a storage device for storing data accessible from the first LAN and the second LAN. A control apparatus controls accessibility of the data stored in the storage device from the first LAN and the second LAN. The control apparatus includes an access prevention device for preventing access from the first LAN to the second LAN and from the second LAN to the first LAN and a device for overriding a setting of the access prevention device to allow accessibility of the second LAN from the first LAN.

27 Claims, 3 Drawing Sheets

NETWORK SYSTEM FOR CONTROLLING INDEPENDENT ACCESS TO STORED DATA AMONG LOCAL AREA NETWORKS

CROSS-REFERENCE TO RELATED APPLICATIONS

This application is a U.S. national stage application of copending International Application Ser. No. PCT/JP99/06122, filed Nov. 2, 1999 claiming a priority date of Nov. 5, 1998, and published in a non-English language.

BACKGROUND OF THE INVENTION

1. Field of the Invention

The present invention relates to a network system for connecting multiple LANs (Local Area Network).

2. Background Information

Conventionally, network systems have been introduced in various fields as communication technology has developed. For example, in the field of workpiece observation using a charged particle beam created from an electron source or an ion source, or of a charged particle beam apparatus for carrying out microfabrication processing, a system using a network is being proposed.

FIG. 3 is a block diagram of a related focused ion beam apparatus (FIB), a kind of charged particle ion beam apparatus. FIG. 3 shows that a device-side LAN 301 comprising a focused ion beam apparatus with a LAN is installed in a measurement room separately located from the factory and is LAN connected to a factory-side LAN 309 via TCP/IP (Transmission Control Protocol/Internet Protocol).

The device-side LAN 301 is equipped with a host computer 302 for performing input of instructions when carrying out processing such as observing or working of the workpiece, analysis of collected data, or display of workpiece images. In addition, as processing elements, this LAN 301 has an optical system controller 303 for controlling focusing and magnification of an ion beam with an electric field by controlling a condenser lens and a scanning electrode, an optical axis controller 304 for axially aligning an ion source mounted on an ion source stage and positionally aligning a moveable aperture by using an actuator, a vacuum evacuation unit 305 for evacuating the workpiece room where the workpiece is mounted, a workpiece stage 306 for moving the mounted workpiece to the irradiating position of the beam, and a workpiece conveying apparatus 307 for conveying the workpiece to the workpiece stage 306. Further, the host computer 302 is connected to a storage device 310 for storing various data such as image data of the workpiece. Each processing element has a central processing unit (CPU) and is connected to a bus line 308 together with the host computer 302, and these are connected to the CSMA/CD system LANs using TCP/IP. The host computer 302 and each processing element 303~307 are individually assigned a unique identity (ID) code. The signal exchanged between the host computer 302 and each processing element 303~307 via the bus line 308 is structured to include the ID code, and the destination of the signal is determined by the ID code of the signal on the bus line 308. In the above structured focused beam apparatus, the host computer 302 and each structural element determine, by using the ID code, whether the signal on the bus line 308 is its own.

When it recognizes its own signal, it responds and processes the signal, and when processing completes, outputs a signal including the ID code of the structural element that will be responsible for the next step on to the bus line 308. Therefore, this system processes observing and working of the workpiece, and data such as image data of the workpiece is stored in the storage device 310.

In the previously mentioned related network system, because the device-side LAN 301 is a part of the factory-side LAN 309, the device-side LAN 301 and the factory-side LAN 309 influence each other causing various problems.

In other words, when the number of accesses from the factory-side LAN 309 to the device-side LAN 301 or apparatuses connected to the factory-side LAN 309 increases, the traffic on the bus line 308 increases and the data transfer efficiency within the device-side LAN 301 slows down. On the other hand, the number of accesses from the device-side LAN 301 to the factory-side LAN 309 increases, and the data transfer efficiency within the device-side LAN 301 also slows down. Further, specifications such as transfer speed and settings such as IP address (Internet Protocol Address) in the device-side LAN 301 are limited by, for example, specifications of the factory-side LAN 309, thus preventing independent specification setting.

Meanwhile, as there is mutually free access between the device-side LAN 301 and the factory-side LAN 309, a third party can intrude into the device-side LAN 301 from the factory-side LAN 309 or vice versa, causing the possibility of confidential information leakage in both the device-side LAN 301 and the factory-side LAN 309.

In addition, as there is a possibility of mutual infiltration between the device-side LAN 301 and the factory-side LAN 309, the device-side LAN 301 cannot be remotely supported by the service center connected with a communication line.

It is also possible to have the same problem when multiple LANs other than the device-side LAN 301 and the factory-side LAN 309 are connected.

The present invention is intended to provide a network system connecting multiple LANs, in which multiple LANs do not influence each other, and the shared data are still accessible from these multiple LANs.

In addition, the present invention also maintains confidentiality while solving the previous problem.

Further, this present invention provides a network system performing maintenance by remote operation as well as solving the previous problems.

SUMMARY OF THE INVENTION

The network system of the present invention is equipped with the first LAN, the second LAN, and control or separation means and memory means connected between the first and second LANs. The separation means separates the first and the second LAN so that they do not influence each other and controls accessibility to the memory means from the both first and second LANs.

The separation means can be structured to have changeable settings so that the second LAN can be accessed from the first LAN.

Also, the first LAN can be a factory-side LAN and the second LAN can be a device-side LAN.

Further, the second LAN can be connected to the service center supporting the second LAN through a communication line.

In addition, the second LAN can be a LAN comprising manufacturing apparatus, inspection apparatus, or charged particle beam apparatus.

DETAILED DESCRIPTION OF THE PREFERRED EMBODIMENTS

Figure 1:
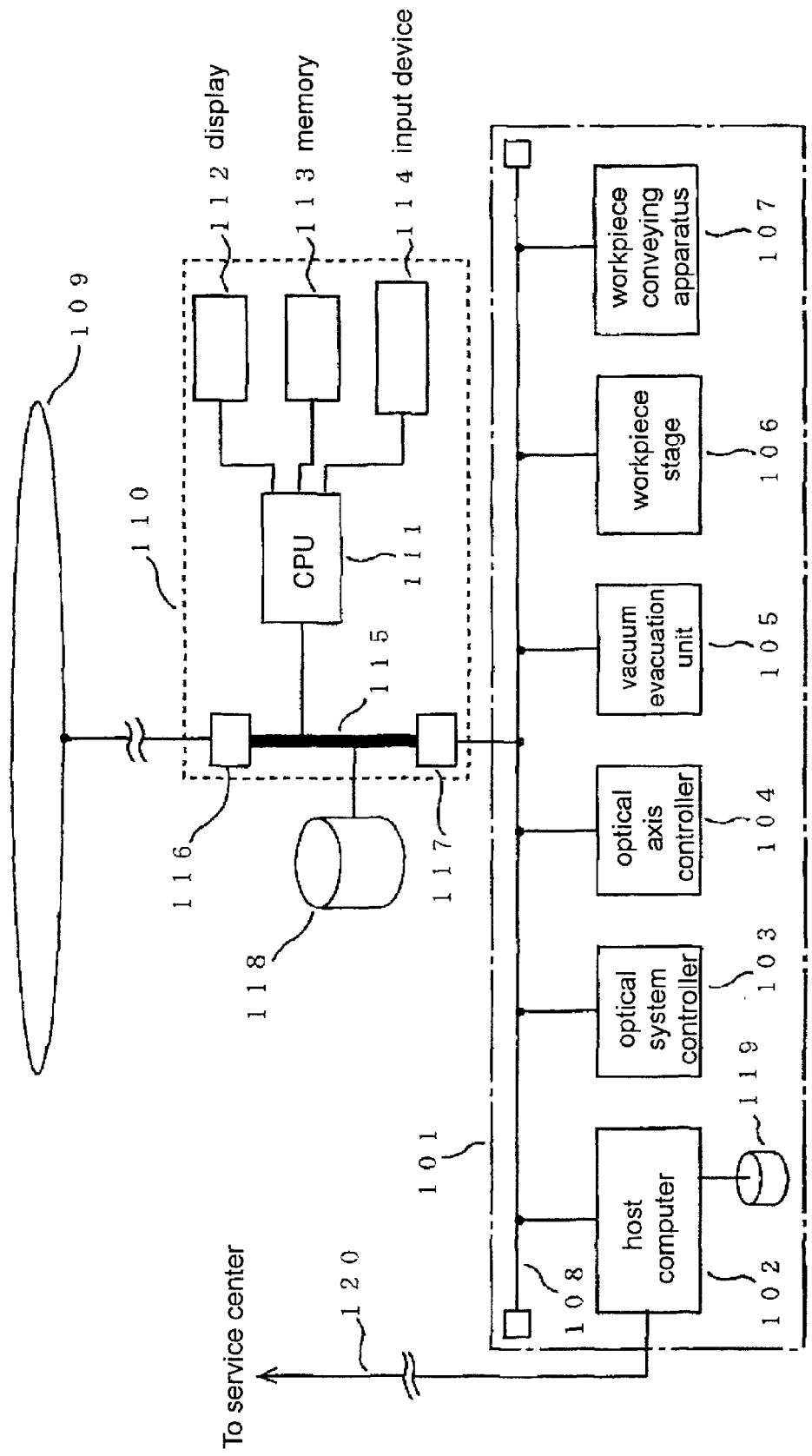
FIG. 1 is a block diagram of a first embodiment of this invention.

FIG. 1 is a block diagram of a network system of a first embodiment of this invention, describing an example in which a device-side LAN is a focused ion beam apparatus (FIB), a kind of a charged particle beam apparatus.

In FIG. 1, a device-side LAN 101 as a second LAN comprising a focused ion beam apparatus is installed in the measurement room located separately from the factory and is connected to a factory-side LAN 109 as a first LAN via TCP/IP through a control means 110 (hereinafter referred to as "separating means") which separates the device-side LAN 101 and the factory-side LAN 109 so that the two LANs do not influence each other. The factory-side LAN 109 is not described in detail but connects, for example, computers via bus lines. The device-side LAN 101 is equipped with a host computer 102 for input instructions for processing such as observing and working of the workpiece, analysis of collected data, or display of workpiece images. In addition, as processing elements, this LAN 101 as an optical system controller 103 for controlling focusing and magnification by controlling a condenser lens, a beam blanking electrode, or a scanning electrode to control an ion beam with an electric field, an optical axis controller 104 for axially aligning an ion source mounted on an ion source stage by using an actuator and piezoelectric element, a vacuum evacuation unit 105 for evacuating the workpiece room where the workpiece is mounted, a workpiece stage 106 for moving the mounted workpiece to the irradiating position of the beam, and a workpiece conveying apparatus 107 for conveying the workpiece to the workpiece stage 106. The essential processing elements making up a charged particle beam device are the optical system controller 103 and the vacuum evacuation unit 105, and the other processing elements are used when needed.

Each processing unit has a central processing unit (CPU) and is connected to a bus line 108 together with the host computer 102, and these are connected to the CSMA/CD system LANs using TCP/IP. The host computer 102 and the each processing element 103~107 is individually given a unique identity (ID) code. The signal exchanged between the host computer 102 and the each processing element 103~107 via the bus line 108 is structured to include the ID code, and the destination of the signal is determined by the ID code of the signal on the bus line 108. The host computer 102 is connected to a storage device 119 for storing various items of confidential data. Also, the host computer 102 is connected to a service center remotely supporting the device-side LAN 101 through a dedicated line 120 as a communicate line.

The separation means 110 is preferably a computer having a CPU 111, a display 112, a memory 113 storing a program for the CPU 111, an input device such as a keyboard 114, a dedicated path 115, and network cards 116 and 117. The path 115 is connected to a device-side LAN 101 and a factory-side LAN 109 via the network cards 116 and 117. Further, the path 115 is connected to a storage device 118 as a storing means for storing shared data requiring no confidentiality.

The separation means 110 is so that there is no mutual influence between the device-side LAN 101 and the factory-side LAN 109, and while it prevents access from the device-side LAN 101 to the factory-side LAN 109 and access from the factory-side LAN 109 to the device-side LAN 101, it enables access to the storage device 118 from both the device-side LAN 101 and the factory-side LAN 109. In other words, the network cards 116 and 117 can individually transmit a signal in one direction, and although it is possible to access from the device-side LAN 101 to the storage device 118 through the network card 117 and the path 115, it is not possible to access from the device-side LAN 101 to the factory-side LAN 109 through the network card 116. In addition, although it is possible to access from the factory-side LAN 109 to the storage device 118 through the network card 116 and the path 115, it is not possible to access from the factory-side LAN 109 to the device-side LAN 101 through the network card 117. However, the separation means 110 is configured so that its setting can be changed by a person with a special authority operating the input device 114 so that both the device-side LAN 101 and the factory-side LAN 109 can be mutually accessible.

The operation of the above structured network system is explained in the following.

First, as an example of operation of the device-side LAN 101, in a case of an operation for conveying a workpiece to the workpiece room and setting it at the prescribed position, an operator first inputs an instruction signal for setting a workpiece, in the host computer 102.

Then, the host computer 102 responds to the instruction input and outputs an instruction signal including the ID code of the vacuum evacuation unit 105 to the bus line 108.

The vacuum evacuation unit 105 receives the instruction signal sent to the bus line 108 from the host computer 102, determines the ID code included in the signal, identifies the instruction signal as its own, responds to the signal to fill a preliminary workpiece room with air, and opens the door of the preliminary workpiece room. After the above process is completed, the vacuum evacuation unit 105 outputs a signal with the ID code of the workpiece conveying apparatus 107 to the bus line 108 in order to transfer processing to the workpiece conveying apparatus 107 which will handle the next step. The workpiece conveying apparatus 107 receives the instruction signal sent to the bus line 108 from the vacuum evacuation unit 105, determines the ID code included in the signal, identifies the instruction signal as its own, and responds to the signal to convey the workpiece to the preliminary workpiece room. After the above process is completed, the workpiece conveying apparatus 107 outputs a signal with the ID code of the vacuum evacuation unit 105 that will handle the next process step to the bus line 108.

Thereafter, as described above, each structural element determines, using the ID code, whether the signal on the bus line 108 is its own. When it recognizes its own signal, it processes the signal and after completion of the process outputs a signal including the ID code of the structural element handling the next step to the bus line 108.

In short, when the workpiece conveying apparatus 107 completes the process and a signal including the ID code of the vacuum evacuation unit 105 is output to the bus line 108, the vacuum evacuation unit 105 responds to the signal to evacuate the preliminary workpiece room, and after completion of the process outputs a signal including the ID code of the optical system controller 103 to the bus line 108.

The optical system controller 103 receives the signal from the vacuum evacuation unit 105 and controls a high voltage for the optical system controller in the workpiece room so as to put it in the off condition preventing the high voltage from being discharged in the event of vacuum deterioration, and after completion of the process outputs a signal including the ID code of the vacuum evacuation unit 105 to the bus line 108. The vacuum evacuation unit 105 receives the signal from the optical system controller 103, releases a valve between the workpiece room and the preliminary workpiece room to connects these rooms, and after completion of the process outputs a signal including the ID code of the workpiece stage 106 to the bus line 108.

After receiving the signal from the vacuum evacuation unit 105, the workpiece stage 106 moves to the transferring position of the workpiece, and after completion of the process outputs a signal including the ID code of the workpiece conveying apparatus 107 to the bus line 108.

After receiving the signal from the workpiece stage 106, the workpiece conveying apparatus 107 transfers the workpiece from the preliminary workpiece room to the workpiece stage 106 in the workpiece room, and after completion of the process outputs a signal including the ID code of the workpiece stage 106 to the bus line 108.

After receiving the signal from the workpiece conveying apparatus 107, a workpiece stage 106 moves, and the workpiece is transferred to the irradiating position of the ion beam. After completion of the transferring process, the workpiece stage 106 outputs a signal including the ID code of the vacuum evacuation unit 105 to the bus line 108.

Next, the vacuum evacuation unit 105 receives the signal from the workpiece stage 106, and the valve between the workpiece room and the preliminary workpiece room is closed to separate the workpiece room and the preliminary workpiece room. After completion of the valve closing process, the vacuum evacuation unit 105 outputs a signal including the ID code of the optical system controller 103 to the bus line 108.

Lastly, the optical system controller 103 receives the signal from the vacuum evacuation unit 105, recovers the high voltage for the optical system controller in the workpiece room, and outputs a signal including the ID code of the host computer 102 to the bus line 120. This completes the processing sequence for workpiece conveying.

The above set workpiece is scanned with an ion beam producing secondary electrons detected by a secondary electron detector, and data such as display data of the workpiece are collected. When the collected data is confidential, it is stored in the storage device 119, whereas when the collected data is not confidential, it is stored in the storage device 118 to which the factory-side LAN 109 has access. The host computer 102 and each processing element 103~107 distribute the processing, as in the above described system.

In the device-side LAN 101, when accessing data stored in the storage device 118, it has to go through from the host computer 102 to the bus line 108, the network card 117 and the bus line 115 of the separation means 110, and this data is used for various processing such as image analysis by the host computer 102.

In addition, in the factory-side LAN 109, when accessing data stored in the storage device 118, it has to go from the factory-side LAN 109 to the network card 116 and the bus line 115 of the separation means 110, and this data is used, for example, in manufacturing processes in the factory-side LAN 109. In this case, because the device-side LAN 101 and the factory-side LAN 109 are mutually separated by the separation means 110, the device-side LAN 101 and the factory-side LAN do not influence each other, thus maintaining confidentiality between the two.

On the other hand, when the device-side LAN 101 is remotely supported by the service center, the host computer 102 is accessed through the dedicated line 120. In this case, because the factory-side LAN 109 is separated from the device-side LAN 101 by the separation means 110 and is not to be accessed from the service center, the device-side LAN 101 can be supported while maintaining confidentiality of data, etc. in the factory-side LAN.

However, in the event that the device-side LAN 101 has to be directly accessed from the factory-side LAN 109, such as when confidential data stored in the storage device 119 have to be accessed from the factory-side LAN or when the device-side LAN 101 has to be supported from the factory-side LAN 109, the device-side LAN 101 can be accessed from the factory-side LAN 109 through the network card 116, the path 115, and the network card 117 of the separation means 110 by a person with special authority operating the input device 114 to change the settings of the separation means 110. On the other hand, in the event that the factory-side LAN 109 has to be directly accessed from the device side LAN 101, as previously mentioned, by operating the input device 114 to change the settings of the separation means 110, the factory-side LAN 109 can be accessed from the device-side LAN 101 through the network card 117, the path 115, and the network card 116 of the separation means 110.

Figure 2:
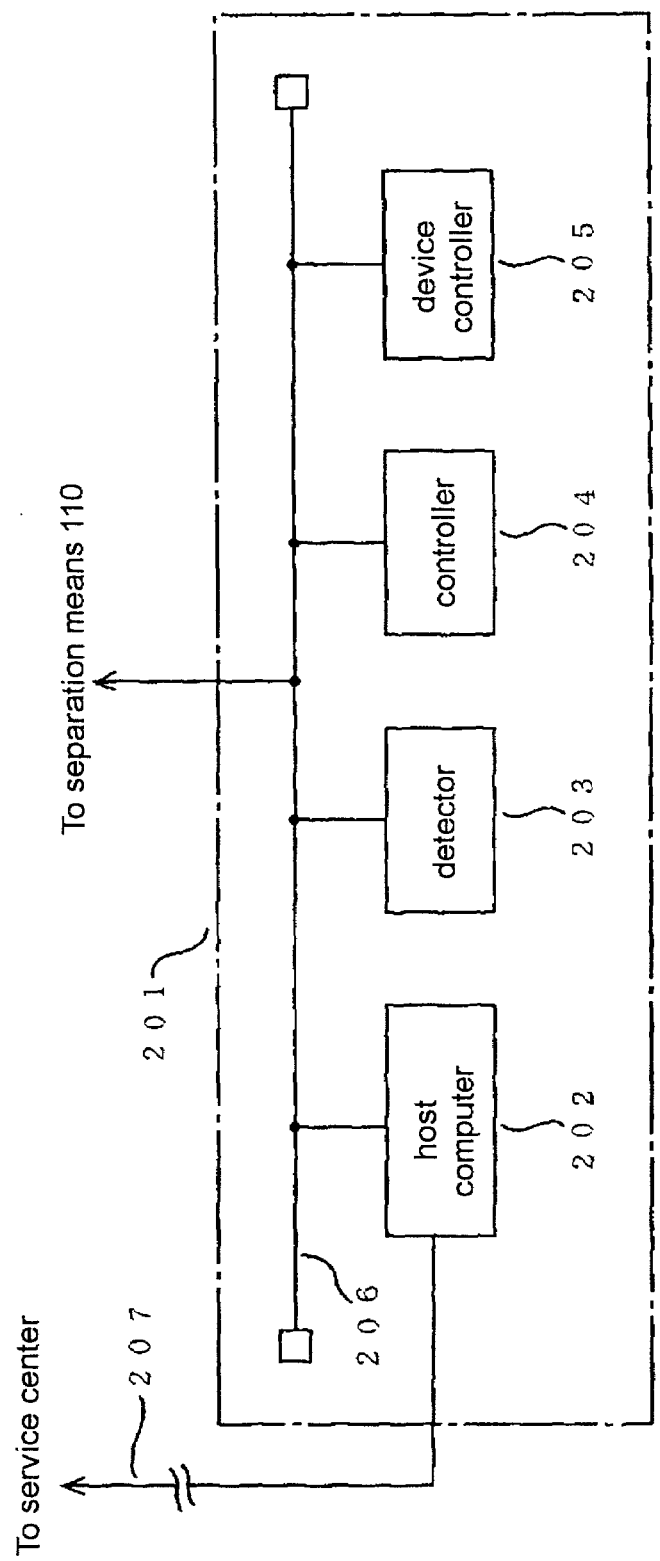
FIG. 2 is a block diagram of a second embodiment of this invention.
Figure 3:
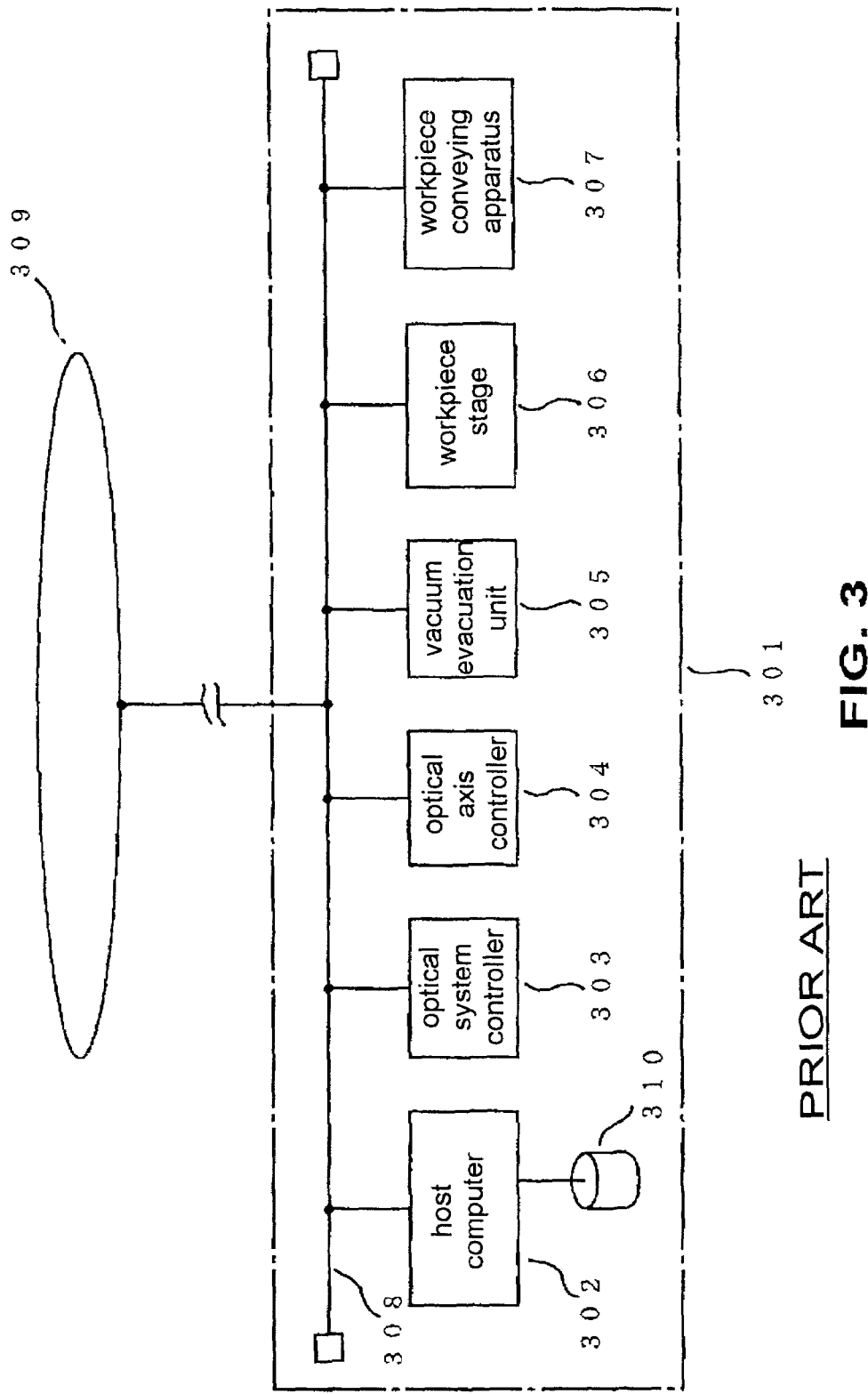
FIG. 3 is a block diagram of a network system using a related focused ion beam apparatus.

FIG. 2 is a block diagram of a second embodiment of the present invention, showing an example of using a manufacturing apparatus as the device-side LAN in the FIG. 1. Incidentally, since the structure and the connection relationship of the separation means 110 and the factory-side LAN 109 as a first LAN is the same as that in FIG. 1, description thereof is omitted.

In FIG. 2, the device-side LAN 201 as a second LAN comprising a machine tool is equipped with a host computer 202 for performing input of various instructions as well as functioning as a sequencer, and comprises, as processing elements, a detector 203 for carrying out image recognition processing by CCD (Charge Coupled Device), a controller 204 for carrying out alignment of a workpiece and performing work processing, for example, and a drive controller 205 for performing drive processing of a processing tool, such as a drill.

As in the first embodiment, each processing element 203~205 has a central processing unit (CPU) and is connected to a bus line 206 together with the host computer. These are connected by the CSMA/CD system LANs using TCP/IP to the factory-side LAN 109 through the separation means 110. The host computer 202 is configured to connect to the service center through a dedicated line 207 as a communication line.

Additionally, as in the first embodiment, the host computer 202 and each processing element 203~205 are individually assigned a unique identity (ID) code. The signals exchanged between the host computer 202 and each processing element 203~205 via a bus line 206 are configured to include the ID code. It is further configured that by determining the ID code included in the signal on the bus line 206 as its own, the host computer and each processing element perform distributed processing and work processing for the workpiece.

Also in the second embodiment, because the device-side LAN 201 and the factory-side LAN 109 are mutually separated by the separation means 110, the device-side LAN 201 and the factory-side LAN do not influence each other, thus keeping confidentiality between the two.

Additionally, when the service center remotely supports the device-side LAN 201, because the factory-side LAN 109 is not accessed from the service center, it is possible to maintain confidentiality of data, etc in the factory-side LAN 109. Incidentally, the second embodiment shows an example of the manufacturing apparatus as the device-side LAN 201, but it is also possible to make various changes such as using a data processing apparatus as a host computer 202 as well as constructing inspection apparatus by appropriately selecting each structural element 202~205. In general, as an inspection apparatus has more processing data than a manufacturing apparatus, distribution of processing is more effective when configuring an inspection apparatus in a device-side LAN. As previously mentioned in each embodiment, in a network system connecting multiple LANs, it is possible to prevent mutual influence between LANs.

Therefore, it is possible to prevent deterioration of the data transfer efficiency in the device-side LAN 101 and 202 due to the influence of the factory-side LAN 109. On the other hand, it is possible to prevent deterioration of the data transfer efficiency in the factory-side LAN 109 due to the influence of the device-side LAN 101 and 202.

Moreover, specifications such as transfer speed or settings such as IP address in the device-side LAN 101 and 201 can be readily carried out.

Additionally, it is advantageous that the confidentiality of the device-side LAN 101 and 201 as well as the factory-side LAN 109 can be maintained.

Furthermore, while maintaining the confidentiality, it is possible to remotely support the device-side LAN 101 and 201 from the service center via dedicated lines 120 and 207. Incidentally, each embodiment shows an example of a charged particle beam device, a manufacturing apparatus, and an inspection apparatus as the device-side LAN 101 and 201, but it is also possible to apply this to other LAN structured apparatuses. As for the factory-side LAN 109, other LANs can also be used.

Also, although the device-side LAN 101 and 201 are supported through a dedicated wire line, these can be supported by a radio communication line.

Further, although an example of inspection is explained as one example of the support of the device-side LAN 101 and 201, it is also possible to perform monitoring of the device-side LAN or upgrading of software used in the device-side LAN 101 and 201.

Furthermore, from the device-side LAN 101 and 201, their operation activities can be periodically transmitted to the service center by e-mail or facsimile through a communication line.

In addition, although the separation 110 is comprised of one computer, it is possible for a computer connected to the device-side LAN 101 and 201 and a computer connected to the factory-side LAN 109 to be mutually path connected, and a storage device storing their shared data can be connected to this path.

Additionally, a router or an intelligent hub, for example, can be used as a separation means.

Moreover, each LAN can be configured not only by electric cables but also by optical fibers.

The present invention can prevent LANs from influencing each other in a network system connecting multiple LANs.

Additionally, while preventing influence between LANs, it is possible to maintain confidentiality in a network system connecting multiple LANs.

Further, while maintaining confidentiality, it is possible to remotely support LANs.

What is claimed is:

1. A network system comprising: a first LAN; a second LAN; storage means for storing data accessible from the first LAN and the second LAN; and control means for controlling accessibility of the data stored in the storage means from the first LAN and the second LAN, the control means including access prevention means for preventing access from the first LAN to the second LAN and from the second LAN to the first LAN, and means for overriding a setting of the access prevention means to allow accessibility of the second LAN from the first LAN.

2. A network system according to claim 1; wherein the first LAN comprises a LAN on a factory side and the second LAN comprises a LAN on a device side.

3. A network system according to claim 2; further comprising communication means for communicating the second LAN to a remote service center to allow remote maintenance of the second LAN.

4. A network system according to claim 3; wherein the second LAN comprises a manufacturing apparatus.

5. A network system comprising: a first LAN comprised of a LAN on a factory side; a second LAN comprised of a LAN on a device side; storage means for storing data accessible from the first LAN and the second LAN; and control means for controlling accessibility of the data stored in the storage means from the first LAN and the second LAN, the control means including access prevention means for preventing access from the first LAN to the second LAN and from the second LAN to the first LAN.

6. A network system according to claim 5; further comprising communication means for communicating the second LAN to a remote service center to allow remote maintenance of the second LAN.

7. A network system according to claim 5; wherein the second LAN comprises a manufacturing apparatus.

8. A network system according to claim 5; wherein the second LAN comprises an inspection apparatus.

9. A network system according claim 5; wherein the second LAN comprises a charged particle beam apparatus.

10. A network system according to claim 1; further comprising communication means for communicating the second LAN to a remote service center to allow remote maintenance of the second LAN.

11. A network system according to claim 1; wherein the second LAN comprises a manufacturing apparatus.

12. A network system according to claim 1; wherein the second LAN comprises an inspection apparatus.

13. A network system according to claim 1; wherein the second LAN comprises a charged particle beam apparatus.

14. A network system according to claim 2; wherein the second LAN comprises a manufacturing apparatus.

15. A network system according to claim 2; wherein the second LAN comprises an inspection apparatus.

16. A network system according to claim 2; wherein the second LAN comprises a charged particle beam apparatus.

17. A network system according to claim 3; wherein the second LAN comprises an inspection apparatus.

18. A network system according to claim 3; wherein the second LAN comprises a charged particle beam apparatus.

19. A network system comprising: a first local area network; a second local area network; a storage device for storing data; and control means for controlling independent accessibility of the data stored in the storage device from the first local area network and the second local area network without allowing access from the first local area network to the second local area network and from the second local area network to the first local area network.

20. A network system according to claim 19; wherein the first local area network is connected to the second local area network via a transmission control protocol/internet protocol.

21. A network system according to claim 20; wherein the control means comprises a first network card driver for transmitting a signal from the first local area network to the storage device to allow access of the data in the storage device by the first local area network, and a second network card driver for transmitting a signal from the second local area network to the storage device to allow access of the data in the storage device by the second local area network.

22. A network system according to claim 19; further comprising communication means for communicating the second local area network to a remote service center to allow remote maintenance of the second local area network.

23. A network system according to claim 22; wherein the communication means does not permit access of the first local area network by the remote service center.

24. A network system according to claim 19; wherein the control means comprises an input device for inputting data corresponding to a setting allowing accessibility of the second local area network from the first local area network.

25. A network system according to claim 19; wherein the second local area network comprises a manufacturing apparatus.

26. A network system according to claim 19; wherein the second local area network comprises an inspection apparatus.

27. A network system according to claim 19; wherein the second local area network comprises a charged particle beam apparatus.

* * * * *